April 17, 1962     V. A. AGOSTINI     3,029,542
FISHHOOK RETRIEVER
Filed March 3, 1961
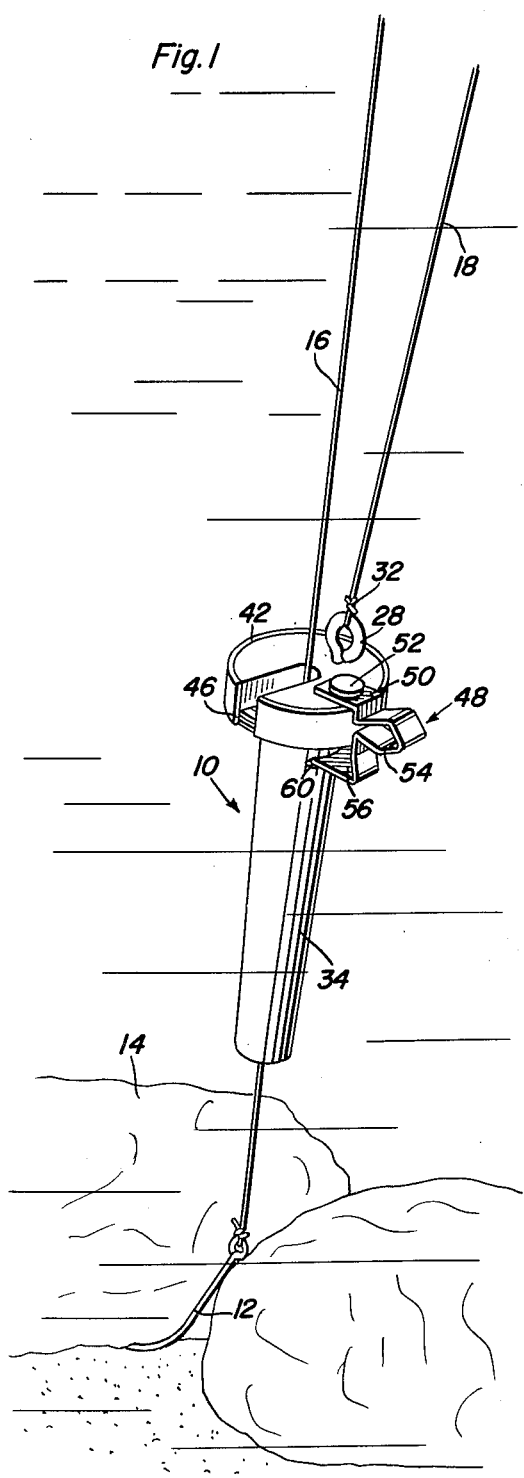
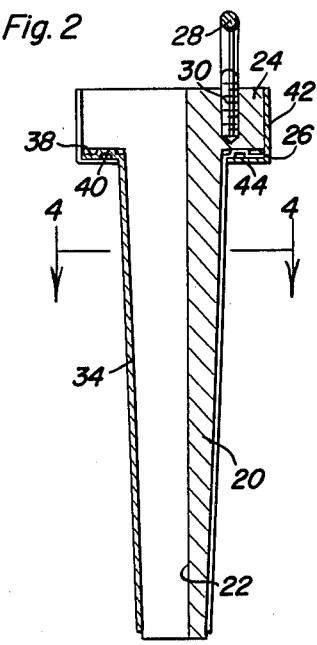
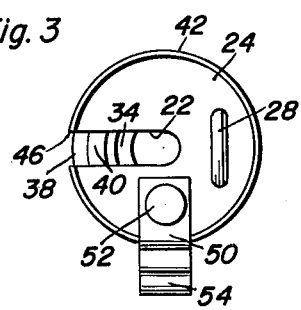
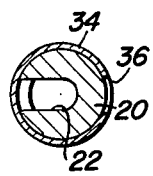
Victor A. Agostini
*INVENTOR.*

United States Patent Office 3,029,542
Patented Apr. 17, 1962

3,029,542
FISHHOOK RETRIEVER
Victor A. Agostini, 302 Washington Ave.,
Bennington, Vt.
Filed Mar. 3, 1961, Ser. No. 93,060
5 Claims. (Cl. 43—17.2)

The present invention generally relates to a retrieving device for fishhooks, lures, artificial fish bait and the like and incorporates a novel structural arrangement for enabling easy assembly and disassembly of the retrieving device in relation to the fishing line.

It quite often occurs that the fishhook, artificial bait or lure or the like having a hook thereon becomes snagged or hooked onto underwater obstructions such as rocks, logs and the like. Due to the particular nature of fishhooks, it is quite difficult to dislodge the hooks from the underwater object. One solution is to cut the fish line and lose the fishhook, lure and a portion of the fishing line. This is quite expensive and generally avoided if possible. Accordingly, it is the primary object of the present invention to provide a retrieving device which will assist in the disengagement of fishing hooks from underwater obstructions which it may engage.

Another object of the present invention is to provide a fishhook retriever in the form of an elongated weighted body having a rotatable sleeve therein in which the body and sleeve are provided with longitudinal slots for assembly on a fish line after which the sleeve may be rotated so that the slot therein is misaligned with the slot in the body for retaining the retriever on the fishing line.

Still another feature of the present invention resides in the provision of a novel means for retaining the sleeve and weighted body in assembled condition and also rotatably or angularly adjusted position for retaining the slot in the sleeve misaligned with the slot in the body for securing the device to the fish line.

Still another important object of the present invention is to provide a fishhook retriever which is simple in construction, easy to use, efficient in operation and quite inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the fishhook retriever of the present invention illustrating the manner in which it is used;

FIGURE 2 is a longitudinal, vertical sectional view of the fishhook retriever illustrating the structural details thereof;

FIGURE 3 is a top plan view of the fishhook retriever; and

FIGURE 4 is a transverse, plan sectional view taken substantially upon a plane passing along section line 4—4 of FIGURE 2 illustrating the relationship of the sleeve and body.

Referring now specifically to the drawings, the numeral 10 generally designates the fishhook retriever of the present invention which is employed for assisting in removing hooks 12 from under underwater obstructions such as rocks 14 or the like. It is pointed out that the device may be used in dislodging any type of artificial bait or lure having hooks thereon from any type of underwater obstructions such as rocks 14, logs, twigs or anything else upon which the hook 12 may become accidentally entangled with. The retriever 10 is mounted on the fish line 16 and is itself attached to a line 18 by which the retriever 10 is moved longitudinally on the fish line 16 for purposes of removing or dislodging the hook 12 in a manner described hereinafter.

The fishhook retriever 10 includes an elongated tapered body 20 which is in the form of a weight and which includes a longitudinally continuous radial slot 22 therein. The slot 22 extends over a major portion of the diameter of the tapered body 20 which is circular in cross-sectional configuration. The upper end of the tapered body 20 is provided with an enlargement 24 which is also circular in transverse configuration and the slot 22 is continuous through the enlargement 24 and extends to the radial edge thereof whereby the fishing line 16 may be disposed in the slot 22 by engaging the slot 22 over the line 16 in an obvious manner. The enlargement 24 defines a downwardly facing peripheral flange 26 where it joins with the tapered portion of the body 20 which is elongated.

Connected with the enlargement 24 is an eye member 28 screwthreaded into the enlargement 24 as by a screw threaded shank 30 for attachment of the manipulating line 18 by employing a suitable knot 32 or the like.

Rotatably received on the elongated tapered body 20 is a tapered sleeve 34 which is also circular in transverse configuration as illustrated in FIGURE 4 and which is provided with a longitudinal slot 36 extending throughout the length thereof. The sleeve 34 is rotatable on the body 20 for alignment of the slot 36 with the slot 22 and also for misalignment of the slot 36 in relation to the slot 22. When the slot 36 is aligned with the slot 22, the device may be assembled on the fishing line 16 after which the sleeve 36 may be rotated into misalignment with the slot 22 thus locking the device to the fishing line 16. This provides for easy assembly and disassembly of the retrieving device in relation to the fishing line 16.

The upper end of the sleeve 34 underlies the shoulder or flange 26 and includes an outturned flange 38 having a peripheral offset portion 40 disposed intermediate the edges thereof which forms a bearing engagement with the flange 26 for ease of rotation of the sleeve 34 in relation to the body 20. For retaining the sleeve 34 assembled on the body 20, there is provided a cylindrical cap 42 having an inturned flange 44 underlying the flange 38 and retaining the flange 38 adjacent the shoulder or flange 26 on the enlargement 24. The cap 42 encircles the enlargement 24 and is provided with a slot 46 in alignment with the slot 22. Also, for purposes of retaining the cap in place, it may be secured to the enlargement 24 in any suitable manner such as by welding or by having an inwardly turned flange at the upper edge thereof overlying the peripheral portion of the top surface of the enlargement 24. The cap 42 is rigid with the body 20 whereas the sleeve 34 may be rotated in relation to both the cap 42 and the body 20.

After the assembly of the device on the fishing line has been accomplished, it is then desirable to retain the slot 36 misaligned with the slot 22. This is accomplished by virtue of a generally U-shaped spring device generally designated by numeral 48 which has one leg 50 thereof attached to the enlargement 24 by any suitable fastener 52 such as a rivet or the like. The central portion of the spring device 48 is provided with a generally U-shaped configuration 54 and a lower leg 56 is provided which is generally parallel with the upper leg 50 and spaced therefrom. The entire device can be constructed of a leaf spring or the like whereby the spring assembly 48 will effectively frictionally lock the sleeve in relation to the body 20. This is accomplished by suitably shaping the inner free edge of the lower leg 56 to project into a notch 60 in the sleeve and frictionally engage the weight (not detailed). The leg 56 engaging notch 60 orientates the body and sleeve in proper angulated position so that the slot 36 is misaligned with the slot 22 as is illustrated in FIGURE 4. When it is desired to rotate the sleeve, it is only necessary to push upwardly and outwardly on the U-shaped portion 54 of the spring device 48 thus releasing the inner end of the leg 56 from the slot or notch 60 formed in the sleeve 34 inasmuch as the spring device 48 is stationary or rigid in relation to the body 20, it is only necessary that the slot or indentation 60 be formed in the sleeve 34 at the desired position for locking the sleeve and body 20 in the desired angular orientation about their longitudinal axes.

The device may be constructed of any suitable materials which are non-corrosive and the body 20 has sufficient weight to slide down the fishing line into engagement with the upper end of the hook 12 or the fish lure whereby the hook may be moved downwardly in order to disengage it from the obstruction 14 which may be in the form of a rock, log or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishhook retriever comprising an elongated exteriorly tapered weighted body having a longitudinal slot therein opening through the longitudinal peripheral surface of the body, an elongated correspondingly tapered sleeve encasing and rotatably mounted on the body, said sleeve having a longitudinal slot therein for selective alignment with the slot in the body for receiving a fish line whereby the body and sleeve may be mounted on the fish line for longitudinal movement, means on the upper end of the body for connection thereto of a manipulating line whereby the weighted body and sleeve may be lifted longitudinally of the fish line and then dropped down against a fishhook or the like for releasing the fishhook and underwater obstructions, said body having an enlarged upper end, and a cap substantially enclosing and attached to the enlarged upper end and rotatably engaged with an upper end of the sleeve for assembling and retaining the sleeve rotatably on the body.

2. The structure as defined in claim 1 wherein the enlargement at the upper end of the body is provided with a generally U-shaped spring device having one leg thereof attached to the enlargement, the other leg of the U-shaped spring device frictionally engaging the body for retaining the sleeve in angularly adjusted position about the longitudinal axis of the sleeve and body.

3. The structure as defined in claim 2 wherein said sleeve is provided with a recess therein for engagement with the inner end of the bottom leg of the U-shaped spring device for locking the sleeve device with the slot therein misaligned with the slot in the body.

4. The structure as defined in claim 3 wherein the upper end of the sleeve is provided with an outwardly extending flange underlying the bottom of the enlargement at the upper end of the body, said flange having an upwardly offset peripheral portion in bearing engagement with the enlargement for rotatably engaging the undersurface of the enlargement.

5. The structure as defined in claim 4 wherein said cap is provided with an inturned flange underlying the flange on the upper end of the sleeve thereby rotatably securing the sleeve to the body.

References Cited in the file of this patent

UNITED STATES PATENTS

| | | |
|---|---|---|
| 2,534,790 | Moore | Dec. 19, 1950 |
| 2,651,132 | Lennen | Sept. 8, 1953 |
| 2,761,235 | Payne | Sept. 4, 1956 |
| 2,809,460 | Taylor | Oct. 15, 1957 |